United States Patent [19]

Nalewajek

[11] 4,400,360

[45] Aug. 23, 1983

[54] RECOVERY OF GADOLINIUM AND GALLIUM OXIDES

[75] Inventor: David Nalewajek, West Seneca, N.Y.

[73] Assignee: Allied Corporation, Morris Township, Morris County, N.J.

[21] Appl. No.: 445,824

[22] Filed: Dec. 1, 1982

[51] Int. Cl.$^3$ .................... C01F 17/00; C01G 15/00
[52] U.S. Cl. .................... 423/21.1; 423/111; 423/122; 423/127; 423/132
[58] Field of Search .................... 423/21.1, 111, 122, 423/125, 127, 132

[56] References Cited

U.S. PATENT DOCUMENTS

| 3,506,585 | 4/1970 | Otsuka et al. | 423/21.1 |
| 4,198,231 | 4/1980 | Gusset | 423/21.1 |
| 4,375,453 | 3/1983 | Nalewajek et al. | 423/21.1 |

FOREIGN PATENT DOCUMENTS 21990  1/1981  European Pat. Off. ............ 423/112

OTHER PUBLICATIONS

Schultze et al, "Chemical Absts.", vol. 85, 1976, #66231n.

Primary Examiner—Herbert T. Carter

Attorney, Agent, or Firm—Arthur J. Plantamura; Jay P. Friedenson

[57] ABSTRACT

A process is described whereby the by-products derived from the fabrication of $Gd_3Ga_5O_{12}$ (GGG) wafers sliced from boules grown from $Gd_2O_3$ and $Ga_2O_3$ can be reprocessed in sufficient purity to be re-used in the process of growing GGG boules, thereby improving the economics of GGG wafer production. Gadolinium and gallium oxides are recovered and separated from transition metal impurities introduced during fabrication of GGG wafers. The "saw kerf" produced from slicing the crystal boule is dissolved in HCl and filtered to remove residual solids. Gasolinium oxalate is precipitated from the acidic solution by the addition of oxalic acid. Calcination at 850° C. resulted in the isolation of $Gd_2O_3$ of >99.99 purity.

The pH of the filtrate is adjusted to about 11 with alkali metal hydroxide followed by the addition of sulfide ion. The precipitated transition metal sulfides are removed by filtration. Excess sulfide is removed by treatment with 30% $H_2O_2$. The pH is adjusted to 8.5 and the gallium hydroxide, which precipitated, removed by filtration. Calcination at about 850° C. resulted in the recovery of $Ga_2O_3$ in yields of the order of 95% and of 99.99% purity.

10 Claims, No Drawings

RECOVERY OF GADOLINIUM AND GALLIUM OXIDES

DESCRIPTION

This invention relates to a method for recovering gadolinium and gallium from by-products generated during fabrication of gadolinium gallium garnet (GGG) wafers in a form which possesses a purity suitable to be recycled in the growth of the GGG boules from which the wafers are made. In particular, the GGG by-products are transformed to compounds which can be conveniently separated from each other and from transition metal impurities (based on solubilities) by use of sulfide ion and thereafter the separated compounds are converted to high purity oxides.

BACKGROUND OF THE INVENTION

The electronics industry has invested substantially in time and money in the fabrication of components used in connection with bubble device technology. The attraction for this investment has centered on the expectation of a rapidly expanding bubble memory market. These devices serve to span the gap between expensive semiconductors and the mechanically sensitive magnetic disks and tapes.

The substrate material for these devices is composed of a stoichiometric composition of gadolinium-gallium oxides, $Gd_3Ga_5O_{12}$, commonly referred to as gadolinium-gallium garnet or GGG. Current fabrication techniques for these materials in which a GGG boule or single crystal is grown and then sliced into wafers and polished result in the generation of the order of 80% by-products that are based on relatively expensive starting materials. A method for the recovery and separation of high purity oxides, so that the by-product material could be re-used in the process in a practical manner would aid significantly the economics of production of these GGG wafers.

While the problem of by-product recovery and purification has existed for a number of years in the industry, and attempts to recover by-products have been reported, no economically suitable method is known. For example, U.S. Pat. No. 4,198,231 involves digesting the scrap material and precipitating the gadolinium. However, to recover the gallium, a costly electrolytical deposition step is required. In copending U.S. patent application, Ser. No. 334,719 filed Dec. 28, 1981, now U.S. Pat. No. 4,375,453, entitled "Recovery of Gadolinium and Gallium Oxides", a process involving the digestion of by-product scrap and the precipitation of gadolinium and gallium as the sulfates and oxalates which avoids the relatively expensive electrolysis step is disclosed. The present method provides an alternative to the process described in the above U.S. Pat. No. 4,375,453 and comprises a practical and effective means to recover gadolinium and gallium.

SUMMARY OF THE INVENTION

An important aspect of the invention resides in the fact that reprocessing of the GGG by-products is accomplished by using inexpensive raw materials for dissolution, precipitation and isolation. Furthermore, by employing selective acids, precipitation of only the desired salts of gadolinium and gallium can be attained free of transition metal impurities that are deleterious to the growth of GGG crystals.

The by-product material, consisting of $Gd_3Ga_5O_{12}$, to be reclaimed is separated from lubricating oil by vacuum filtration, thermally treated to remove any remaining organic substrate which adheres to the particles, is dissolved in mineral acids and, after digestion to ensure maximum dissolution, the solution is filtered to remove insoluble particles. The particles filtered consist mainly of diamond dust, aluminum oxide and $Gd_3Ga_5O_{12}$ of particle size $\leq 250$ $\mu$m and may be ground to a smaller size and treated again with mineral acid. The gadolinium and gallium salts are precipitated from the particle-free solution by addition of oxalic acid or ammonium oxalate and pyrolyzed to high purity oxides.

The precipitation and isolation of the gadolinium and gallium from transition metal impurities is based on the removal of the impurities as metal sulfides in a basic medium (pH = 10–11) followed by a final pH adjustment (8.5) to precipitate the gallium either as the hydroxide or as the ammonium oxalate salt. To the thus pretreated GGG saw kerf filtrate, a stoichiometric amount of oxalic acid is added to precipitate gadolinium oxalate, $Gd_2(C_2O_4)_3$. The precipitate, which forms immediately, is stirred and then separated from the mother liquor which contains the gallium and transition metal impurities. The cake of gadolinium oxalate, thus obatined, is slurried with a water solution which contains 2% oxalic acid (by weight) to remove residues of the mother liquor which adhere to the particles and gives a final filtration and the cake is dried to yield gadolinium oxalate of high purity which is then converted to gadolinium oxide, $Gd_2O_3$, by pyrolysis at 850° C. to yield a product of high yield and purity.

The combined filtrates from the first step are basified with a suitable base or combination of bases, and a sulfide ion, e.g., a solution of sodium sulfide, $Na_2S$, is added to precipitate the transition metal sulfides. The mixture is digested and filtered. The filtrate which contains the tetrahydroxo-gallate ion, $Ga(OH)_4^-$, is acidified and treated with dilute hydrogen peroxide to oxidize any remaining traces of the sulfide ion. Any elemental sulfur which precipitates is removed from the solution by filtration. The pH of the filtrate is basified to about 8.5 at which point a white flocculant precipitate of gallium hydroxide forms.

Alternatively, ammonium oxalate, $(NH_4)_2C_2O_4$, may be added to the filtrate prior to the pH adjustment to precipitate ammonium gallium oxalate, $NH_4Ga(C_2O_4)_2$. After thorough stirring, e.g., for about 4 hours, the precipitate is filtered, and the filter cake washed with a water solution which has its pH adjusted to 7.25 with ammonium hydroxide.

The gallium compound which precipitates is dried at 20° C. then pyrolyzed at 850° C. to gallium oxide, $Ga_2O_3$. Yields range between 90–95% with a purity of about 99.99%. The amount of cross contamination in either of the two oxides was <10 ppm.

DETAILED DESCRIPTION OF THE INVENTION

The process described in this invention, while dealing specifically with "saw kerf", can be extended to include the purification of by-products generated in other manufacturing stages in the growth of the GGG crystal boules and fabrication of the wafers. It will be understood that minor changes in the pre-treatment of the bulk by-products may be appropriate. These can include (a) grinding (ball milling) of boule heels or boule ends before dissolution, (b) thermal cracking of boule heels or ends, or (c) washing the by-products generated during polishing steps with an organic solvent (chlorofluorocarbons) to eliminate lubricating oils.

In the reprocessing of saw kerf, the material to be reclaimed is separated from lubricating oil by vacuum filtration and then pyrolyzed at 700° C. to remove any remaining organic substrate which adheres to the particles. This treated material, which consists of gadolinium gallium oxide in the approximate stoichiometry of $Gd_3Ga_5O_{12}$ and transition metal impurities identified as magnesium, nickel, zirconium, aluminum, iron and silicon, and including diamond dust and aluminum oxide particles, is dissolved in a suitable mineral acid. Preferably, for example, hydrochloric acid, e.g. 37%, is used although nitric acid (70%) may also be used. After digestion for 3 hours to ensure maximum dissolution, the solution is filtered to remove insoluble particles. Any such particles removed often consist mainly of diamond dust, aluminum oxide and $Gd_3Ga_5O_{12}$ of particle size $\geq 250$ μm. If substantial amounts of the $Gd_3Ga_5O_{12}$ particles are collected on the filter, they may be ground to a smaller size and treated again with mineral acid. Usually the quantity of particles collected is not significant when dealing with saw kerf. The gadolinium and gallium salts are precipitated from the particle-free solution by addition of oxalic acid or ammonium oxalate and are then pyrolyzed to high purity oxides by the method described below.

The precipitation and isolation of gadolinium from gallium and transition metal impurities is based on the insolubility of gadolinium oxalate at low pH ($\sim 0.5$–1). The precipitation and isolation of gallium from transition metal impurities is based on the removal of the impurities as metal sulfides in a basic medium (pH=10–11) followed by a final pH adjustment on the base side, to about pH 8.5, to precipitate the gallium either as the hydroxide or as the ammonium oxalate salt.

After pre-treating the saw kerf as described above, a stoichiometric amount of oxalic acid is added to the filtrate to precipitate gadolinium oxalate, $Gd_2(C_2O_4)_3$, as a fine, white, microcrystalline solid. The precipitate which forms immediately is stirred for 4–6 hours to afford complete separation and then the precipitate is separated from the mother liquor which contains the gallium and transition metal impurities by conventional methods, i.e. by vacuum filtration or centrifugation. The cake of gadolinium oxalate, thus obtained, is slurried with a water solution which preferably contains 2% oxalic acid (by weight) to remove the last traces of the mother liquor which may have adhered to the particles. A final filtration and drying at 20° C. produces gadolinium oxalate of a purity and yield in the order of 95% and greater. This solid gadolinium oxalate is converted to gadolinium oxide, $Gd_2O_3$, by pyrolysis at a temperature in excess of 800° C., and preferably at temperatures of the order of 850° C. The resulting product, obtainable in high yield and purity, is used in the growth of GGG crystals.

To recover the gallium, the combined filtrates from the first step are basified to a pH in excess of 9 with a suitable base, such as potassium hydroxide, sodium hydroxide or ammonium hydroxide or mixtures, or by bubbling ammonia through the filtrate in combination with sodium or potassium hydroxide, for example. A source of sulfide ion, e.g., a solution of sodium sulfide, $Na_2S$, is added to precipitate the transition metal sulfides. Alternative sources of sulfide ion such as ammonium sulfide, hydrogen sulfide, ammonium polysulfide, potassium sulfide, thioacetamide, and the like may be used in lieu of the sodium sulfide. The mixture is digested and filtered. The filtrate which contains the tetrahydroxo-gallate ion, $Ga(OH)_4-$, is acidified and oxidized in a suitable manner such as by treating with dilute hydrogen peroxide to oxidize any remaining traces of the sulfide ion. Oxidants other than hydrogen peroxide, such as nitric acid, may be used provided that intolerable levels of contaminants are not introduced. Any elemental sulfur which precipitates is removed from the solution by filtration. The pH of the filtrate is adjusted to a pH between 8 and 9 and preferably to about 8.5 at which point a white flocculant precipitate of gallium hydroxide forms.

Alternatively, ammonium oxalate, $(NH_4)_2C_2O_4$, may be added to the filtrate, prior to the pH adjustment, to precipitate ammonium gallium oxalate, $NH_4Ga(C_2O_4)_2$. After stirring for an appreciable period, e.g., about 4 hours, to enhance complete separation the precipitate is filtered and the filter cake washed with a water solution which has its pH adjusted at about neutral, e.g., to about pH 7.25 with ammonium hydroxide or other suitable base.

The precipitate is dried at 20° C. and then pyrolyzed at a temperature of at least 800° C. and preferably at a temperature of the order of 850° C., to gallium oxide, $Ga_2O_3$. Yields obtained range between 90–95% with the product having a final purity of the order of 99.99%. The amount of cross contamination in either of the gadolinium or gallium oxides was less than 10 ppm.

The several features and advantages of the invention will be apparent in greater detail from the following examples. It will be understood, however, that although these examples may describe in detail certain preferred operational conditions of the invention, they are given primarily for purposes of illustration and the invention in its broadest aspects is not limited to details specified in the Examples.

EXAMPLE 1

Dried saw kerf, recovered from gadolinium-gallium-garnet, $Gd_3Ga_5O_{12}$, of composition 54% gadolinium oxide and 46% gallium oxide, derived from wafer fabrication, was pyrolyzed at 700° C. for 3 hours to decompose organic impurities. 500 g of the pyrolyzed material, with a particle size $\leq 250$ μm, was refluxed for 3 hours in 1300 mL of 37% hydrochloric acid. The solution which contained gadolinium and gallium chlorides as well as transition metal chlorides was filtered to remove 2 g of insoluble particles.

(a) Gadolinium Recovery

The vigorously stirred filtrate was heated to 80° C. and treated with 750 g of oxalic acid. The precipitation of gadolinium oxalate began immediately. Stirring was continued for 3 hours at 80° C., then at ambient temperature for 3 hours. The mixture was filtered, the filter cake slurried with 500 mL of a 2% oxalic acid/water solution and refiltered. The combined filtrates are saved for the next step. The gadolinium oxalate was dried then pyrolyzed for 6 hours at 850° C. to yield 265 g (98%) of gadolinium oxide, $Gd_2O_3$. The purity of gadolinium oxide based on trace metal analysis was 99.996%.

(b) Gallium Recovery

The pH of the filtrate was adjusted to 10–11 by the addition of $\sim 2500$ mL of a stock solution of potassium hydroxide (stock solution=1900 g KOH/3000 mL $H_2O$). 50 mL of a 5% aqueous sodium sulfide solution was added and the mixture heated to 65° C. for 1 hour. The metal sulfides which precipitated were removed by filtration. The pH of the filtrate was adjusted to 5 by the addition of 37% hydrochloric acid. 20 mL of 30% hydrogen peroxide was added, the solution stirred for 1 hour at 880° C., then filtered to remove the precipitated sulfur. The pH of the filtrate was adjusted to 8.5 with ammonium hydroxide, the precipitated gallium hydroxide stirred for 4 hours, filtered, washed (500 mL of water, pH=7.25), and pyrolyzed at 850° C. for 6 hours. The yield of gallium oxide, $Ga_2O_3$, was 218 g (94.7%). Purity based on trace metal analysis was 99.997%.

EXAMPLE 2

The gadolinium was reprocessed as gadolinium oxalate and dried and pyrolyzed as described in Example 1.

The combined filtrate of (b) for Gallium Recovery was similarly treated as described in Example 1 except as follows:

Prior to the final pH adjustment, 720 g of ammonium oxalate was added. The pH was adjusted to 8.5, the white precipitate of ammonium gallium oxalate stirred for 4 hours, filtered, washed with 500 mL of a 1% ammonium oxalate/water solution, and pyrolyzed at 850° C. for 6 hours. The yield of gallium oxide, $Ga_2O_3$, was 213 g (92.7%). Purity based on trace metal analysis was 99.996%.

The process of the present invention, it is thus seen, eliminates a number of process steps required heretofore, i.e. precipitation of gadolinium and gallium sulfates, conversion to ammonium oxalate and use of ethanol to isolate gallium sulfate for example. The gadolinium oxalate is isolated directly after dissolution of the kerf and pyrolyzed to $Gd_2O_3$. The gallium is isolated directly from this filtrate after the transition metals are precipitated with $Na_2S$. The gallium salts are similar and pyrolyzed in the same fashion. The reprocessing to recover these valuable by-products, according to the process of the present invention, is substantially more economical.

It will be understood that variations may be made in the several conditions and the treating chemicals employed and in ranges disclosed and that these disclosed limitations, provided in order to more particularly describe the invention, should not be regarded as limitations except as set forth in the claims which follow:

What is claimed is:

1. A method for recovering gadolinium and gallium oxides from by-product material which contains these oxides, transition metals and various other impurities comprising the steps of:
    (a) dissolving the by-product material which contains the gadolinium and gallium oxide in an acid medium,
    (b) isolating the filtrate,
    (c) precipitating gadolinium values from said filtrate by forming gadolinium oxalate,
    (d) separating, washing and drying the precipitated gadolinium oxalate,
    (e) converting the gadolinium oxalate salt from step (d) to gadolinium oxide by pyrolysis,
    (f) basifying the filtrate of step (b),
    (g) adding sulfide ion to the filtrate of step (f) to precipitate therefrom the transition metal sulfides from the aqueous solution and filtering the solids,
    (h) acidifying the filtrate from step (g) and oxidizing residual sulfide ion from said filtrate by the addition of an oxidant, and adjusting the pH of the filtrate to a base condition to precipitate gallium hydroxide, and
    (i) isolating, drying and calcining the gallium hydroxide from step (h) to yield gallium oxide.

2. The method of claim 1 wherein gadolinium and gallium oxide dissolved in step (a) is pretreated by pyrolyzing to remove organic impurities.

3. The method of claim 1 wherein the by-product material in step (a) is dissolved in hydrochloric acid.

4. The method of claim 1 wherein the gadolinium oxalate salt from step (e) is pyrolyzed at a temperature in excess of 800° C.

5. The method of claim 1 wherein the basifying of the filtrate in step (f) is adjusted to a pH in excess of 9.

6. The method of claim 1 wherein the pH in step (h) is adjusted to between 8 and 9.

7. The method of claim 1 wherein the gallium hydroxide in step (i) is pyrolyzed to at least 800° C.

8. A method for recovering gadolinium and gallium oxides from by-product material which contains these oxides and various impurities comprising the steps of:
    (a) dissolving the gadolinium and gallium oxide in an acid medium,
    (b) isolating the filtrate,
    (c) precipitating gadolinium values from said filtrate by forming gadolinium oxalate,
    (d) separating, washing and drying the precipitated gadolinium oxalate,
    (e) converting the gadolinium oxalate salt from step (d) to gadolinium oxide by pyrolyzing at a temperature in excess of 800° C.,
    (f) basifying the filtrate from step (b) to a pH in excess of about pH 9,
    (g) adding sulfide ion to the filtrate of step (f) and precipitating the transition metal sulfides from the aqueous solution and filtering the solids,
    (h) acidifying the filtrate from step (g) and removing remaining traces of sulfide ion from said filtrate by oxidizing same through the addition of hydrogen peroxide and thereafter adjusting the pH to about 8.5 to precipitate gallium hydroxide, and
    (i) isolating, drying and calcining the gallium hydroxide from step (h).

9. The method for recovering gadolinium and gallium oxides from by-product material which contains these oxides, transition metals and various other impurities comprising the steps of:
    (a) dissolving the by-product material which contains the gadolinium and gallium oxide in an acid medium,
    (b) isolating the filtrate,
    (c) precipitating gadolinium values from said filtrate by forming gadolinium oxalate,
    (d) separating, washing and drying the precipitated gadolinium oxalate,
    (e) converting the gadolinium oxalate salt from step (d) to gadolinium oxide by pyrolysis,
    (f) basifying the filtrate of step (b),
    (g) adding sulfide ion to the filtrate of step (f) to precipitate therefrom the transition metal sulfides from the aqueous solution and filtering the solids,
    (h) adding ammonium oxalate to the filtrate of step (g) to yield ammonium gallium oxalate as a precipitate, and
    (i) isolating, drying and calcining the ammonium gallium oxalate from step (h) to yield gallium oxide.

10. The method of claim 9 wherein the by-product material from which gadolinium and gallium oxides are to be recovered is pretreated by pyrolyzing to remove organic material.

* * * * *